INVENTOR
Roy Marsden
BY
ATTORNEY

United States Patent Office 3,223,816
Patented Dec. 14, 1965

3,223,816
METHODS OF ELECTRIC ARC BUTT WELDING
Roy Marsden, Bolton, England, assignor to The Superheater Company Limited, London, England, a British company
Filed Dec. 9, 1963, Ser. No. 328,804
Claims priority, application Great Britain, Dec. 10, 1962, 46,595/62
8 Claims. (Cl. 219—61)

This invention relates to a method for electric arc butt welding of tubes which is particularly suitable for butt welding relatively thick-walled tubes having a wall thickness of about ¼" or more.

A difficulty which has been experienced in butt welding such relatively thick-walled tubes is that the weld penetration normally has been insufficient to produce a good weld between the tubes across their whole thicknesses. This difficulty has previously been overcome by reducing the tube wall thickness by local external machining of the tubes in the regions of their end faces to be welded together to leave wall thicknesses of the order of penetration which can be obtained by a manually effected external welding process. The tubes are then clamped together with those faces abutting and externally manually welded over the region of reduced wall thicknesses. The weld joint is completed by restoring the wall thicknesses with a filler metal.

According to the present invention, a method of butt welding together tubular members using an automatic electric arc welding process, comprises the steps of securing the members in end abutting relationship and successively effecting butt welds between the abutting members, one of the welds being effected internally of the members and the other weld being effected externally of the members so that the two welds each extend only partly through the wall thicknesses of the members and in interfusing relationship with each other to form a composite fusion welded joint between the members.

The method of butt welding according to the invention provides a reproducible method of fusion welding together relatively thick-walled tubes and enables tubes of greater wall thickness to be welded together without the use of a filler metal than was possible with the previous method referred to above. Further, backings, such as copper plugs or pressurized gas for example, normally required in known methods of butt welding need not be used in the method according to the invention because the ends of the tubes to be welded are faced prior to securing the tubes in end-abutting relationship and serve to retain the weld pool when the first weld is made and then the first weld forms a backing for the weld pool of the second weld.

In one embodiment of the invention the internal weld is effected before the external weld but the method also may be performed effecting the external weld first.

Conveniently, the abutting members may be clamped together by means for rotating the members about their common axis and rotated so that the peripheral abutting regions of the members move successively past welding electrodes positioned internally and externally respectively of the members. Alternatively, the abutting tubular members may be clamped in a stationary position and internal and external welding electrodes rotated about the common axes of the tubes to pass around the internal and external peripheries of the members to effect the interfusing internal and external welds between them.

The fusion welds may also be effected using automatic non-consumable electrode welding processes or consumable electrode welding processes.

The internal and external welds may each extend through rather more than half the wall thicknesses of the tubular members but this is not essential and one weld may extend through considerably more than half the wall thicknesses whilst the other weld extends a lesser distance.

Preferably, the welding operations are effected in an atmosphere of protective gas, e.g. argon.

By way of example, a method of welding in accordance with the invention will be described in greater detail with reference to the accompanying drawings, in which.

Figure 1:
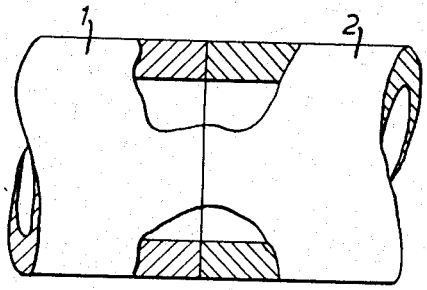
FIGS. 1, 2 and 3 show various steps in the method according to the invention.
Figure 2:
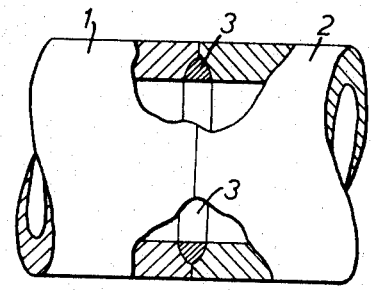
Figure 3:
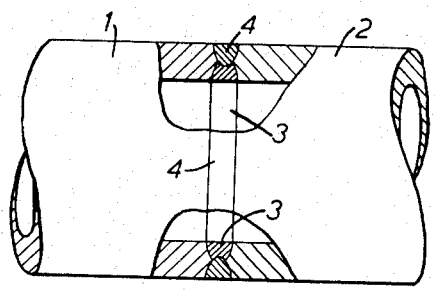

Referring more particularly to FIGS. 1-3, FIG. 1 shows two relatively thick-walled tubular members 1 and 2 to be butt welded together by a fusion weld. The members 1 and 2 have their abutting ends squared and faced and are in end abutting relationship over the area of their wall thickness. Firstly, an internally effected fusion weld 3 is effected between the tubular members 1 and 2, FIG. 2, using an automatic fusion welding machine, the weld 3 extending only partly through the wall thicknesses of the tubular members, the weld 3 shown in FIG. 2 penetrating approximately half-way through the wall thicknesses. An external fusion weld 4 then is effected using an automatic fusion welding machine, between the two tubular members 1 and 2, the weld 4 penetrating only partly through the wall thicknesses of the members 1 and 2 and interfusing with the weld 3 as shown in FIG. 3. There is thereby produced a composite fusion welded joint 3, 4 between the tubular members 1 and 2, uniting those members over the whole area of their abutment.

The welds 3 and 4 are effected in a protective atmosphere, for example an argon atmosphere, without the use of backings, such as pressurized gas or plugs, because the abutting ends of the tubular members 1 and 2 are faced thus serving to retain the weld pool during the formation of the internal weld 3 whilst, when effected, the internal weld itself forms a backing for the weld pool of the external weld 4.

Thus, it will be seen that the invention provides a method of butt welding together by an automatic fusion welding method tubular members of a relatively large wall thickness. The method does not have to rely on the use of a fusion weld between two tubular members over part of their wall thickness and the use of filler material to complete the welded joint and therefore produces a more satisfactory joint between the tubular members. The welding operations are effected automatically and hence are capable of successive and consistent reproduction.

A particular manner in which the fusion welds 3 and 4 between the tubular members 1 and 2 may be effected will now be described in greater detail with reference to FIG. 4. As described above, the tubular members 1 and 2 are supported in end abutting relationship by means not shown but which conveniently may comprise rotatable chucks of the type disclosed in more detail by the specification of co-pending application No. 268,398 filed on March 27, 1963, in the name of Roy Marsden and assigned to the assignees of the present application.

Supported within the tubular members 1 and 2 is an internal welding gun having a non-consumable welding electrode 10, made for example of tungsten, secured in a copper block 11 by a grub screw 12, the electrode 10 projecting from the block 11 transversely to the axes of the tubular members 1 and 2. The block 11 is attached by a pair of electrically conductive leaf springs 14 to a metal block 15 having a bore 16 extending from the forward end of the block to a larger diameter recess in the opposite end of the block 15. The welding gun also includes a metal tube 17 which acts as an electric current supply lead for the electrode 10 and as a conduit for protective gas. One end of the tube 17 is screw-threaded in the recess and an insulating collar 18 surrounding the tube 17 maintains that tube and the block 15 in spaced insulated relationship with an outer protective tube 19 which extends beyond the electrode 10 having its end nearer the electrode closed by a removable plug 20. The plug 20 serves to permit access to the tube 19 to permit adjustment or replacement of the welding electrode 10.

The tube 19 has an aperture 21 extending forwardly and rearwardly of the electrode 10 and with which the electrode 10 registers. Supported by the block 11 is a ceramic follower 22 which projects through the aperture 21 rearwardly of the electrode 10 to engage the wall of the tubular member 2 to prevent contact between the electrode 10 and the tubular members 1 and 2.

The internal welding gun described above may be incorporated into a machine as disclosed by the aforementioned co-pending application No. 268,398, being supported on the machine for insertion into the bores of the tubular members to be welded by means which will be apparent to those skilled in the art.

Figure 4:
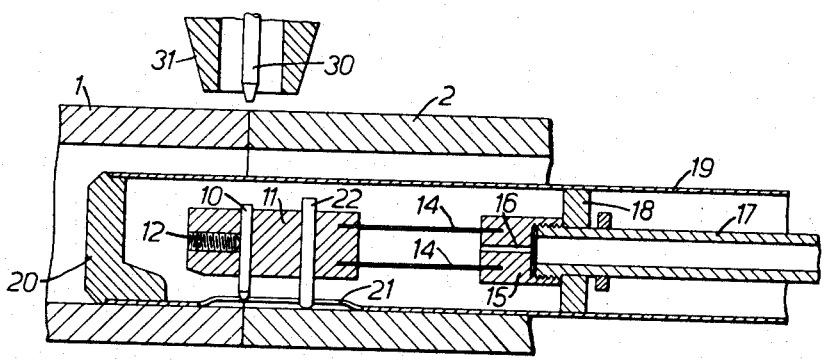
FIG. 4 shows part of a welding apparatus suitable for use in a method according to the invention.

In order to effect the internal weld 3, the internal welding gun is supported within the tubular members in the position indicated in FIG. 4, with the tip of the welding electrode aligned with the plane of abutment between the members 1 and 2. A protective gas such as argon is supplied to the conduit 17 passing through the bore thereof and the bore 16 to fill the protective tube 19 and pass through the aperture 21 to play on and around the abutting ends of the tubular members 1 and 2 in the region of the welding electrode 10. Electric current is supplied to the welding electrode through the tube 17, block 15, leaf springs 14 and block 11 to strike an arc between the electrode 10 and the tubular members 1 and 2. The arc causes fusion of the tubular members 1 and 2 in the region of the electrode 10, the protective gas preventing contamination of the welded joint, and by rotation of the tubular members 1 and 2 about the electrode 10 the welded joint 3 extending around the bore periphery of the tubular members 1 and 2 is effected. The tubular members conveniently are rotated in the manner described in the aforesaid specification of application No. 268,398. The penetration of the weld 3 is approximately half-way through the wall thicknesses of the tubular members 1 and 2 as previously mentioned in the description of FIG. 2.

The leaf springs 14 serve to allow the ceramic follower 22 to engage the internal surface of the tubular member 2 throughout the welding operation even when minor irregularities in the internal surface are encountered.

The external weld 4 is effected subsequent to completion of the internal weld 3 using an external welding gun having a non-consumable tungsten welding electrode 30 which protrudes from a concentric refractory nozzle 31. This external welding electrode 30 is indicated diagrammatically in FIG. 3 with the tip of the electrode 30 located in alignment with the plane of abutment between the tubular members 1 and 2. Conveniently, the electrode 30 forms part of a welding machine of the kind disclosed in the specification of co-pending application No. 268,398 which describes the machine and its manner of operation in greater detail. Briefly, the tubular members 1 and 2 are rotated under the welding electrode 30 to which welding current is supplied, protective gas passing through the nozzle 31 to play around the electrode 30 and provide a protective atmosphere in which the fusion welding takes place. During rotation of the tubular members 1 and 2 they become fused together, producing the weld 4, FIG. 3, between the tubular members 1 and 2, the weld 4 interfusing with the internal weld 3.

The interfusing of the welds 3 and 4 ensures that the resulting composite fusion weld between the tubular members 1 and 2 extends throughout their abutting area. Although the welds 3 and 4 are mentioned in the preceding description as each extending approximately half-way through the wall thickness of the tubular members 1 and 2, this is not essential and one of the welds could penetrate a substantially greater distance than the other weld.

Typical conditions of welding with ferrous tubes of 2⅛″ to 2¼″ outside diameter and wall thickness of about ½″ are 2 to 3 minutes per revolution of the tubular members and the welding guns are supplied with a current of 150 to 170 amperes. For ferrous tubes of 1½″ outside diameter and ¼″ wall thicknesses the conditions are 2 minutes per revolution and the welding guns are supplied with a current of 82 to 100 amperes. When stainless austenitic tubes are used the welding time is approximately halved whilst the current remains of the same order compared with ferrous tubes.

The welding guns may be provided with means for reducing the heat input to the respective welds as the welding progresses, for example, as described in the specification of co-pending application No. 268,398. The electrodes used in the welding guns may be made of materials other than tungsten, for example, thoriated tungsten or zirconiated tungsten. Apart from argon, the protective gas used may be, for example, an argon-hydrogen mixture.

The order in which the internal and external welds are effected is not critical and the external weld may be made first. Also, instead of rotating the tubular members 1 and 2, the welding guns may themselves be orbited respectively internally and externally of the tubes, keeping the tubes stationary. Furthermore, electric arc welding machines other than argon arc guns may be used, for example plasma jet welding machines may be used. In addition, the invention is not restricted to the fusion welding methods utilising non-consumable electrodes but may equally be effected using automatic consumable electrode welding machines.

I claim:

1. A method of butt welding together tubular members using an automatic electric arc welding process, comprising the steps of:
   (a) securing the said members in end-face abutting relationship, and
   (b) successively effecting butt fusion welds between the abutting members using automatic welding methods, one of said welds being effected internally of the members and the other said weld being effected externally of the said members so that the two said welds interfuse with each other through the wall thickness of the said members to form a composite fusion welded joint between the said members.

2. The method defined by claim 1, in which the said internal and external welds are effected by successive relative rotations of the said tubular members and welding electrodes located respectively internally and externally of the said members in registration with the plane of abutment between the said members.

3. The method defined by claim 2, in which the internal and external welds are effected using non-consumable electrode welding methods.

4. A method of butt welding together tubular members using an automatic electric arc fusion welding process, comprising the steps of:
   (a) securing the said members in end-face abutting relationship,
   (b) effecting internally of the said members a fusion welded joint between the said members using an automatic welding method, the said internal welded joint extending only partly through the wall thicknesses of the said members, then
   (c) effecting externally of the said members a fusion welded joint between the said members using an automatic welding method extending only partly through the wall thicknesses of said members and interfusing with the welded joint produced by practising the said step (b), the said internal and external welded joints producing a composite fusion welded joint between the said tubular members.

5. The method as claimed in claim 4, in which the said welding operations are effected in an atmosphere of protective gas.

6. A method of butt welding together tubular members using an automatic electric arc welding process, comprising the steps of:
   (a) supporting the tubular members in end-face abutting relationship,
   (b) positioning a non-consumable welding electrode internally of the tubular members and in the plane of abutment between them,
   (c) automatically rotating the said tubular members about the said welding electrode to effect an internal fusion welded joint between the tubular members said joint extending only partly through the wall thicknesses of the said tubular members,
   (d) positioning a non-consumable welding electrode externally of the tubular members and in the plane of abutment between them,
   (e) automatically rotating the said tubular members about the said external welding electrode to effect an external fusion welded joint betwen them, said external joint extending only partly through the wall thicknesses of the said tubular members and interfusing with the said internal welded joint, the said internal and external welded joints providing a composite fusion welded joint between the said tubular members.

7. The method claimed in claim 6, in which the said internal and external welded joints are effected in protective atmospheres.

8. The method claimed in claim 7, in which each of the said internal and external welded joints extend by approximately the same amount into the wall thicknesses of the said tubular members.

References Cited by the Examiner
UNITED STATES PATENTS

| | | | |
|---|---|---|---|
| 2,716,691 | 8/1955 | Bowman | 219—61 |
| 2,874,263 | 2/1959 | Williams et al. | 219—61 |

RICHARD M. WOOD, *Primary Examiner.*